United States Patent
Zhu (10) Patent No.: US 12,426,109 B2
(45) Date of Patent: Sep. 23, 2025

(54) COMMUNICATION METHOD AND APPARATUS

(71) Applicant: Beijing Xiaomi Mobile Software Co., Ltd., Beijing (CN)

(72) Inventor: Yajun Zhu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 410 days.

(21) Appl. No.: 17/760,171

(22) PCT Filed: Feb. 5, 2020

(86) PCT No.: PCT/CN2020/074354
§ 371 (c)(1),
(2) Date: Aug. 4, 2022

(87) PCT Pub. No.: WO2021/155511
PCT Pub. Date: Aug. 12, 2021

(65) Prior Publication Data
US 2023/0052215 A1 Feb. 16, 2023

(51) Int. Cl.
H04W 76/15 (2018.01)
H04B 7/024 (2017.01)
H04W 72/23 (2023.01)
H04W 76/14 (2018.01)

(52) U.S. Cl.
CPC ............ *H04W 76/15* (2018.02); *H04B 7/024* (2013.01); *H04W 72/23* (2023.01); *H04W 76/14* (2018.02)

(58) Field of Classification Search
CPC ..... H04W 76/15; H04W 72/23; H04W 76/14; H04W 24/02; H04W 88/04; H04W 24/10; H04B 7/024; H04B 7/026
See application file for complete search history.

(56) References Cited

U.S. PATENT DOCUMENTS

2011/0207494 A1* 8/2011 Zhu .................. H04L 5/0014
455/509
2012/0008565 A1 1/2012 Sun et al.
(Continued)

FOREIGN PATENT DOCUMENTS

CN 102870340 A 1/2013
CN 102946264 A 2/2013
(Continued)

OTHER PUBLICATIONS

"Considerations for Geographical Zone Design for NR V2X," Proceedings of the 3GPP TSG-RAN WG2 Meeting #106, InterDigital Inc., R2-1906383 (Resubmission of 1904215), May 13, 2019, Reno, Nevada, 2 pages.

*Primary Examiner* — Oussama Roudani
(74) *Attorney, Agent, or Firm* — McCoy Russell LLP (57) ABSTRACT

A method for communication is applied to a first terminal, and includes: obtaining a notification message sent by a network device, the notification message being used for notifying a determined collaborative terminal, and the collaborative terminal being a second terminal different from the first terminal; and determining, based on the notification message, the second terminal for assisting the first terminal in transmitting data. The examples of the disclosure can effectively improve the coverage performance.

16 Claims, 8 Drawing Sheets

(56) References Cited

U.S. PATENT DOCUMENTS

| | | | | |
|---|---|---|---|---|
| 2012/0057554 | A1* | 3/2012 | Xu | H04L 1/00 |
| | | | | 370/329 |
| 2015/0189042 | A1 | 7/2015 | Sun et al. | |
| 2015/0236777 | A1* | 8/2015 | Akhtar | H04W 36/0005 |
| | | | | 455/450 |
| 2016/0323891 | A1* | 11/2016 | Zhang | H04W 72/23 |
| 2018/0139682 | A1* | 5/2018 | Xu | H04W 40/22 |
| 2018/0288779 | A1* | 10/2018 | Dai | H04W 72/1268 |
| 2020/0329419 | A1* | 10/2020 | Tang | H04W 40/20 |
| 2020/0351690 | A1* | 11/2020 | Zhu | H04B 17/24 |
| 2022/0131675 | A1* | 4/2022 | Xu | H04L 5/0055 |

FOREIGN PATENT DOCUMENTS

| | | |
|---|---|---|
| CN | 103188706 A | 7/2013 |
| CN | 107124689 A | 9/2017 |
| CN | 107770781 A | 3/2018 |

\* cited by examiner

COMMUNICATION METHOD AND APPARATUS

CROSS REFERENCE TO RELATED APPLICATION

The present application is a U.S. National Phase of International Application No. PCT/CN2020/074354 entitled "COMMUNICATION METHOD AND APPARATUS," and filed on Feb. 5, 2020. The entire contents of the above-listed application are hereby incorporated by reference for all purposes.

BACKGROUND

With the emergence of a new generation of AR/VR, vehicle-vehicle communication and other new Internet applications, higher requirements are put forward for wireless communication technology, driving the continuous evolution of wireless communication technology to meet the needs of applications. At present, cellular mobile communication technology is in the evolution stage of a new generation of technology. An important feature of the new generation of technology is to support flexible configuration of multiple business types. Different service types have different requirements for wireless communication technology. For example, the enhanced mobile broad band (eMBB) service type mainly focuses on large bandwidth and high speed, the ultra reliable low latency communication (URLLC) service type mainly focuses on high reliability and low latency, and the massive machine type communication (mMTC) service type mainly focuses on a large number of connections. In this way, the new generation of wireless communication system needs a flexible and configurable design to support the transmission of multiple service types.

The network coverage performance is of great importance to support the transmission of multiple service types. In the case of dense network deployment, the coverage performance can be better, but the cost of an operator will be increased. In the case of sparse network deployment, the coverage performance is poor.

SUMMARY

According to a first aspect of examples of the disclosure, a method for communication is provided. The method for communication is applied to a first terminal, and includes: obtaining a notification message sent by a network device, the notification message being used for notifying a determined collaborative terminal, and the collaborative terminal being a second terminal different from the first terminal; and determining, based on the notification message, the second terminal for assisting the first terminal in transmitting data.

According to a second aspect of examples of the disclosure, a method for communication is provided. The method for communication is applied to a network device, and includes: determining a collaborative terminal of a first terminal; and sending a notification message, the notification message being used for notifying the determined collaborative terminal, and the collaborative terminal being a second terminal different from the first terminal.

It can be understood that the above general descriptions and later detailed descriptions are merely examples and illustration, and cannot limit the disclosure.

BRIEF DESCRIPTION OF THE DRAWINGS

The accompanying drawings, which are incorporated in and constitute a part of the specification, illustrate examples consistent with the disclosure and together with the specification serve to explain the principles of the disclosure.

DETAILED DESCRIPTION

The disclosure relates to the technical field of communications, in particular to a method and apparatus for communication.

In order to improve the network coverage performance, repeated transmission is used in the related art to enhance the network coverage performance. For example, the diversity gain in the frequency domain can be obtained by repeated transmission in the time domain or frequency hopping in the frequency domain, and the uplink coverage performance can be improved. However, the method of repeated transmission in the time domain may result in a low utilization rate of spectrum resources and additional delay. In addition, in the design of a new generation of communication systems at present, many available frequency domain resources have relatively high working frequency points, resulting in further reduction of network coverage.

Examples will be described in detail here, instances of which are illustrated in the accompanying drawings. When the following description refers to the accompanying drawings, unless otherwise indicated, the same numbers in different drawings indicate the same or similar elements. The implementations described in the following examples do not represent all implementations consistent with the disclosure. Rather, they are merely instances of apparatuses and methods consistent with some aspects of the disclosure as detailed herein.

Figure 1:
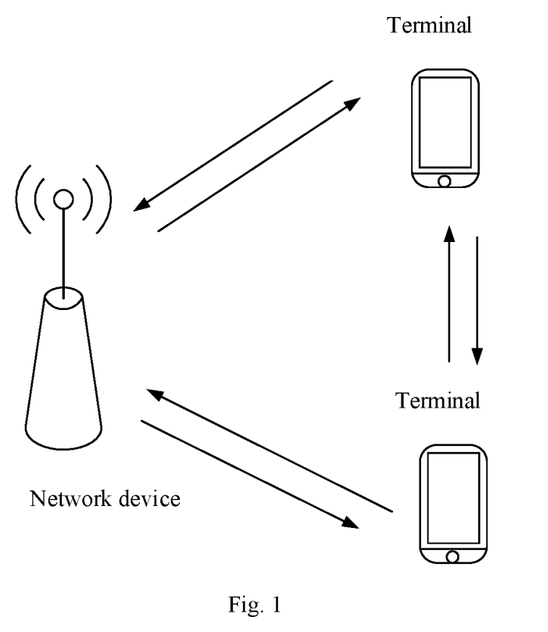
FIG. 1 is a schematic diagram of a wireless communication system according to an example.

A method for communication provided by an example of the disclosure can be applied to a wireless communication system shown in FIG. 1. Referring to FIG. 1, the wireless communication system includes a network device and a terminal. The terminal is connected with the network device via wireless resources, and performs data transmission.

It can be understood that the wireless communication system shown in FIG. 1 is merely a schematic illustration, and the wireless communication system may further include other network devices, such as a core network device, a wireless relay device, and a wireless backhaul device, which are not shown in FIG. 1. The example of the disclosure does not limit the number of network devices and the number of terminals included in the wireless communication system.

It can be further understood that the wireless communication system of the example of the disclosure is a network providing a wireless communication function. The wireless communication system may employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance. According to the capacity, speed, delay and other factors of different networks, the networks can be divided into the 2G (generation) network, the 3G network, the 4G network or the future evolution network, such as the 5G network. The 5G network may also be referred to as a new radio (NR) network. For convenience of description, the disclosure may sometimes refer to a wireless communication network simply as a network.

Further, the network device involved in the disclosure may also be referred to as a wireless access network device. The wireless access network device may be: a base station, an evolved node B, a home base station, an access point (AP) in a wireless fidelity (WIFI) system, a wireless relay node, a wireless backhaul node, a transmission point (TP) or a transmission and reception point (TRP), etc., may also be a gNB in the NR system, or may also be a component or part of devices that constitute the base station. It can be understood that in the example of the disclosure, the specific technology and specific device form adopted by the network device are not limited. In the disclosure, the network device may provide communication coverage for a specific geographic area, and may communicate with terminals located within the coverage area (cell). In addition, when the wireless communication system is a vehicle-to-everything (V2X) communication system, the network device may also be an in-vehicle device.

Further, the terminal involved in the disclosure may also be referred to as a terminal device, user equipment (UE), a mobile station (MS), a mobile terminal (MT), etc., and is a device that provides voice and/or data connectivity. For example, the terminal may be a handheld device with wireless connectivity, an in-vehicle device, etc. At present, some examples of terminals are: mobile phones, pocket personal computers (PPCs), palm computers, personal digital assistants (PDAs), notebook computers, tablet computers, wearable devices, or in-vehicle devices, etc. In addition, when the wireless communication system is the vehicle-to-everything (V2X) communication system, the terminal device may also be an in-vehicle device. It can be understood that the example of the disclosure does not limit the specific technology and specific device form adopted by the terminal.

Figure 2:
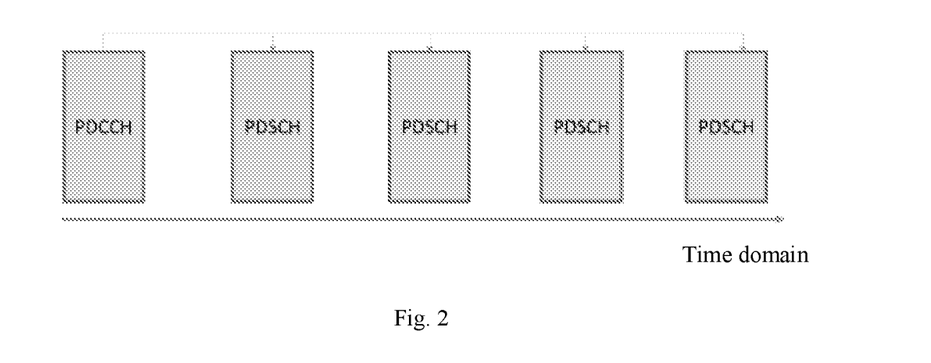
FIG. 2 is a schematic diagram of repeated transmission according to an example.
Figure 3:
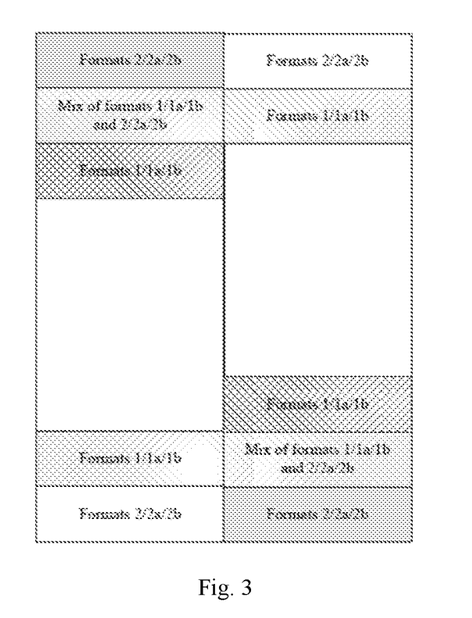
FIG. 3 is a schematic diagram of another repeated transmission according to an example.

In order to improve the network coverage performance, a method of repeated transmission is adopted in the related art. For example, a method of repeated transmission in a time domain shown in FIG. 2. For example, in MTC and narrow band Internet of Things (NB-IoT), repeated transmission is used to accumulate power, so that the effect of coverage enhancement is achieved. In simple terms, repeated transmission is transmission of the same transmission content in a plurality of time units. The time unit may be one subframe or a plurality of subframes. For another example, a diversity gain in a frequency domain may also be obtained by frequency hopping in the frequency domain in a manner as shown in FIG. 3. For example, in a resource mapping method of a physical uplink control channel (PUCCH) of long term evolution (LTE), the reception performance of the PUCCH is improved by mapping the PUCCH on both sides of a frequency domain of an operating carrier.

However, the method of repeated transmission in the time domain may result in a low utilization rate of spectrum resources and additional delay. In addition, in the design of a new generation of communication systems at present, many available frequency domain resources have relatively high working frequency points, resulting in further reduction of network coverage.

It is a feasible technical solution to improve coverage through coordination between terminals, that is, a collaborative terminal assists a terminal with limited coverage in transmitting information. The collaborative terminal is another terminal different from the terminal with limited coverage. However, how to identify the collaborative terminal needs to be clarified.

For convenience of description in the example of the disclosure, the terminal with limited coverage is referred to as a first terminal, and a terminal assisting the first terminal in transmitting information is referred to as a second terminal, which is also sometimes referred to as the collaborative terminal.

Figure 4:
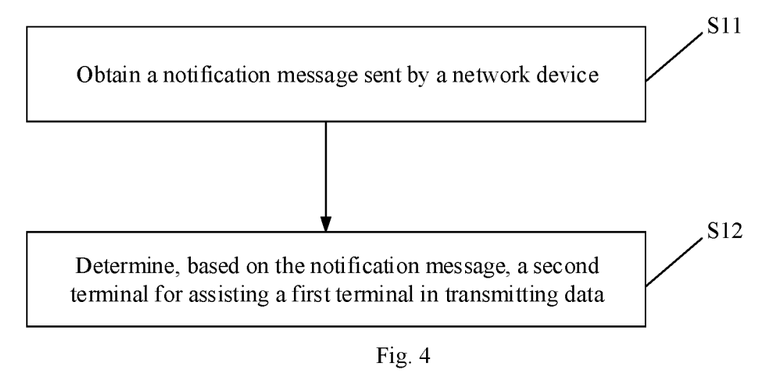
FIG. 4 is a flowchart of a method for communication according to an example.

FIG. 4 is a flowchart of a method for communication according to an example of the disclosure. Referring to FIG. 4, the method for communication is applied to a first terminal, and includes the following steps S11 and S12.

In step S11, a notification message sent by a network device is obtained.

In the example of the disclosure, the notification message sent by the network device is used for notifying a determined collaborative terminal, and the collaborative terminal is a second terminal different from the first terminal.

In step S12, the second terminal for assisting the first terminal in transmitting data is determined based on the notification message.

In the example of the disclosure, the network device may determine the collaborative terminal of the first terminal, and send the notification message to the first terminal and the second terminal to notify the determined collaborative terminal.

Figure 5:
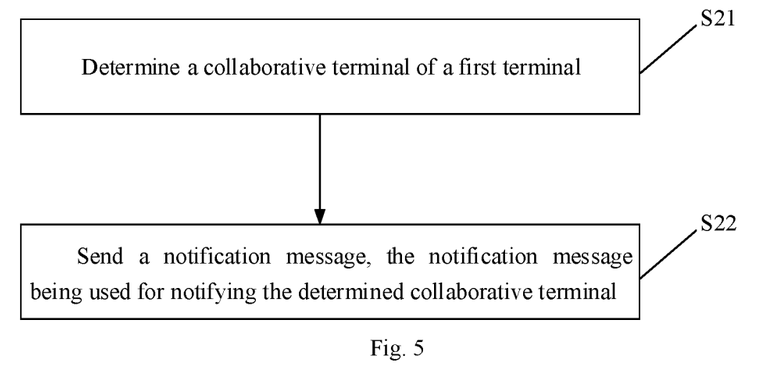
FIG. 5 is a flowchart of another method for communication according to an example.

FIG. 5 is a flowchart of a method for communication according to an example of the disclosure. Referring to FIG. 5, the method for communication is applied to a network device, and includes the following steps S21 and S22.

In step S21, a collaborative terminal of a first terminal is determined.

In step S22, a notification message is sent.

The network device sends the notification message to the first terminal and the second terminal for notifying a determination result of the collaborative terminal. For example, the notification message sent by the network device to the first terminal includes the determined collaborative terminal, and the collaborative terminal is the second terminal different from the first terminal. The notification message sent by the network device to the second terminal may be notifying the second terminal as the collaborative terminal of the first terminal.

In the example of the disclosure, when the network device determines the collaborative terminal of the first terminal, on the one hand, the network device may indicate a terminal to report information and determine the collaborative terminal based on the information reported by the terminal; and on the other hand, the first terminal may report information automatically, and the collaborative terminal is determined based on the reported information.

In the example of the disclosure, when the network device indicates the terminal to report the information and determine the collaborative terminal based on the information reported by the terminal, the information reported by the terminal may be geographic location information and signal intensity information. The network device may determine the collaborative terminal based on the geographic location information or the signal intensity information measured by the first terminal.

In the example of the disclosure, the collaborative terminal is one or a combination of the following terminals:

a terminal geographically closest to the first terminal; a terminal with the highest signal intensity measured by the first terminal; one or more terminals with a geographical distance from the first terminal being smaller than a designated distance threshold; and one or more terminals with signal intensity measured by the first terminal being greater than a designated signal intensity threshold. For example, the network device may select the terminal closest to the first terminal or the terminal with the highest signal intensity measured by the first terminal as the collaborative terminal of the first terminal. Or, the network device may preset the designated distance threshold, and select the one or more terminals with the distance from the first terminal being smaller than the designated distance threshold as the collaborative terminal of the first terminal. Or, the network device may preset the designated signal intensity threshold, and select the one or more terminals with the signal intensity measured by the first terminal being greater than the designated signal intensity threshold as the collaborative terminal of the first terminal.

In one implementation, the network device obtains geographic location information of the first terminal, triggers one or more terminals to report geographic location information, determines, according to the geographic location information reported by the terminal, the distance between the terminal that reports the geographic location information and the first terminal, and determines the collaborative terminal.

In another implementation, the network device sends configuration information to a first terminal. The configuration indication information is used for indicating the first terminal to measure, at a designated location, the signal intensity of target signals for target terminals. For example, the network device configures uplink signals of the target terminals to be measured by the first terminal. The uplink signals of the different target terminals are configured in different time domain locations or frequency domain locations. The first terminal listens the signal intensity of the target signals of the target terminals at the designated location. The network device determines the collaborative terminal among the target terminals based on the signal intensity of the target signals reported by the first terminal.

In the example of the disclosure, the configuration information sent by the network device to the first terminal may further include a signal feature indicating the target signals to be detected by the first terminal. The signal features of the target signals may be sequence information of the signals.

The first terminal listens the target signals at the location indicated by the network device according to the signal features, listens the target signal intensity information of the target terminals, and reports a measurement result to the network device. The network device determines the collaborative terminal of the first terminal according to the measurement result.

After determining the collaborative terminal of the first terminal, the network device may send the determination result of the collaborative terminal to the first terminal and the second terminal in the form of the notification message.

Figure 6:
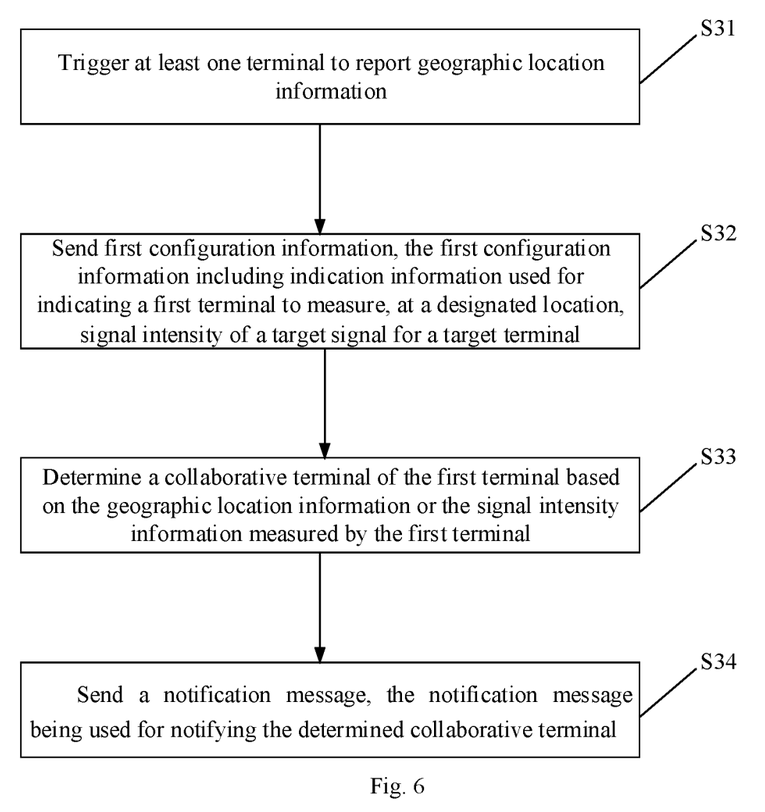
FIG. 6 is a flowchart of yet another method for communication according to an example.

FIG. 6 is a flowchart of a method for communication according to an example of the disclosure. Referring to FIG. 6, the method for communication is applied to a network device, and includes the following steps S31 to S34.

In step S31, at least one terminal is triggered to report geographic location information.

The network device obtains geographic location information of a first terminal, and triggers one or more terminals other than the first terminal to report geographic location information, so as to determine, based on the geographic location information, the collaborative terminal of the first terminal among the other terminals.

In step S32, first configuration information is sent.

The first configuration information includes indication information used for indicating the first terminal to measure, at a designated location, signal intensity of target signals for target terminals.

The first configuration information further includes signal feature information of the target signals.

For example, the signal feature information may be sequence information of the signals. The first terminal may detect the target signals at the designated location based on the signal feature information of the target signals, then determine signal identifiers of the target signals, and report the signal identifiers to the network device.

It can be understood that step S31 and step S32 may be executed alternatively, or both may be executed.

In step S33, the collaborative terminal of the first terminal is determined based on the geographic location information or signal intensity information measured by the first terminal.

In step S34, a notification message is sent. The notification message is used for notifying the first terminal and the second terminal of a determination result of the collaborative terminal.

Figure 7:
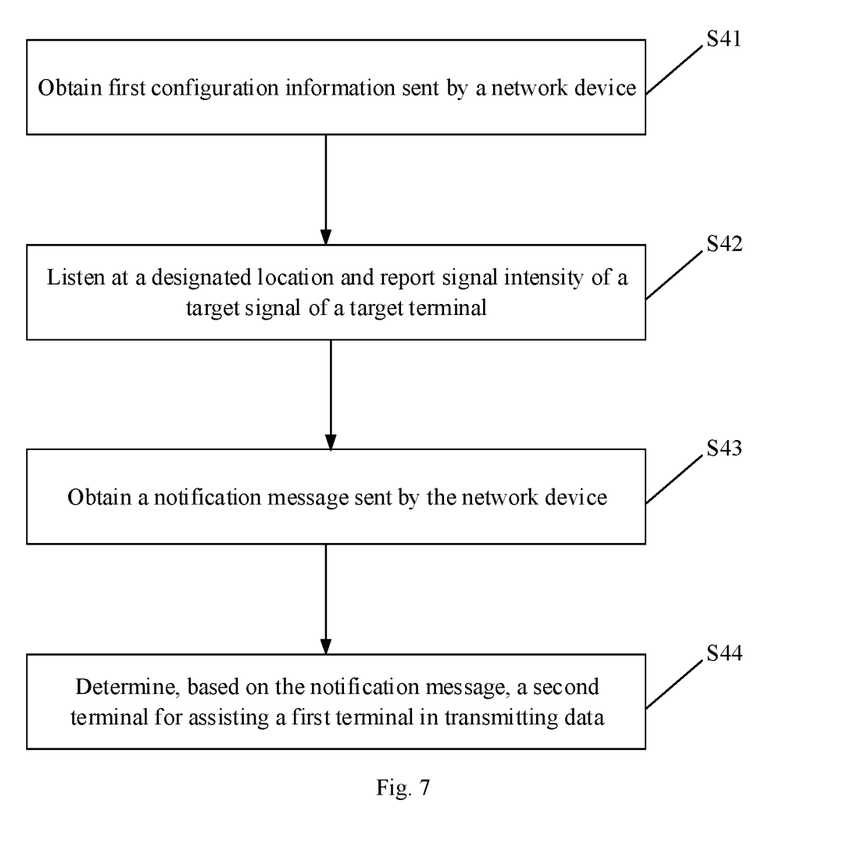
FIG. 7 is a flowchart of yet another method for communication according to an example.

FIG. 7 is a flowchart of a method for communication according to an example of the disclosure. Referring to FIG. 7, the method for communication is applied to a first terminal, and includes the following steps S41 to S44.

In step S41, first configuration information sent by a network device is obtained.

The first configuration information includes indication information used for indicating the first terminal to measure, at a designated location, signal intensity of target signals for target terminals.

In step S42, the signal intensity of the target signals of the target terminals is listened at a designated location and reported.

In the example of the disclosure, a collaborative terminal is determined by the network device based on geographic location information or signal intensity information measured by the first terminal.

In step S43, a notification message sent by the network device is obtained.

In the example of the disclosure, the notification message sent by the network device is used for notifying the determined collaborative terminal, and the collaborative terminal is a second terminal different from the first terminal.

In step S44, the second terminal for assisting the first terminal in transmitting data is determined based on the notification message.

In the example of the disclosure, the network device indicates the terminal to report geographic location information or signal intensity information, and determines the collaborative terminal based on the geographic location information or the signal intensity information, so that the collaborative terminal can be accurately identified. The first terminal performs communication based on the collaborative terminal identified by the network device, so that the network coverage performance can be effectively improved.

In the example of the disclosure, when the first terminal autonomously reports the information and the network device determines the collaborative terminal of the first terminal based on the information reported by the first terminal, the network device may determine the collaborative terminal based on a signal identifier reported by the first terminal and signal intensity of a signal identified by the signal identifier.

In one implementation, in the example of the disclosure, collaboration demand indication information may be sent by the first terminal, and the collaboration demand indication information is used for indicating a terminal receiving the collaboration demand indication information to send a designated uplink signal. The terminal receiving the collaboration demand indication information sends the designated uplink signal. The first terminal detects and measures signal intensity and signal identifier of the designated uplink signal sent by the terminal. The first terminal reports the detected signal intensity information and signal identifier of the uplink signal. The network device determines the collaborative terminal based on the signal identifier reported by the first terminal and the signal intensity of the signal identified by the signal identifier.

Figure 8:
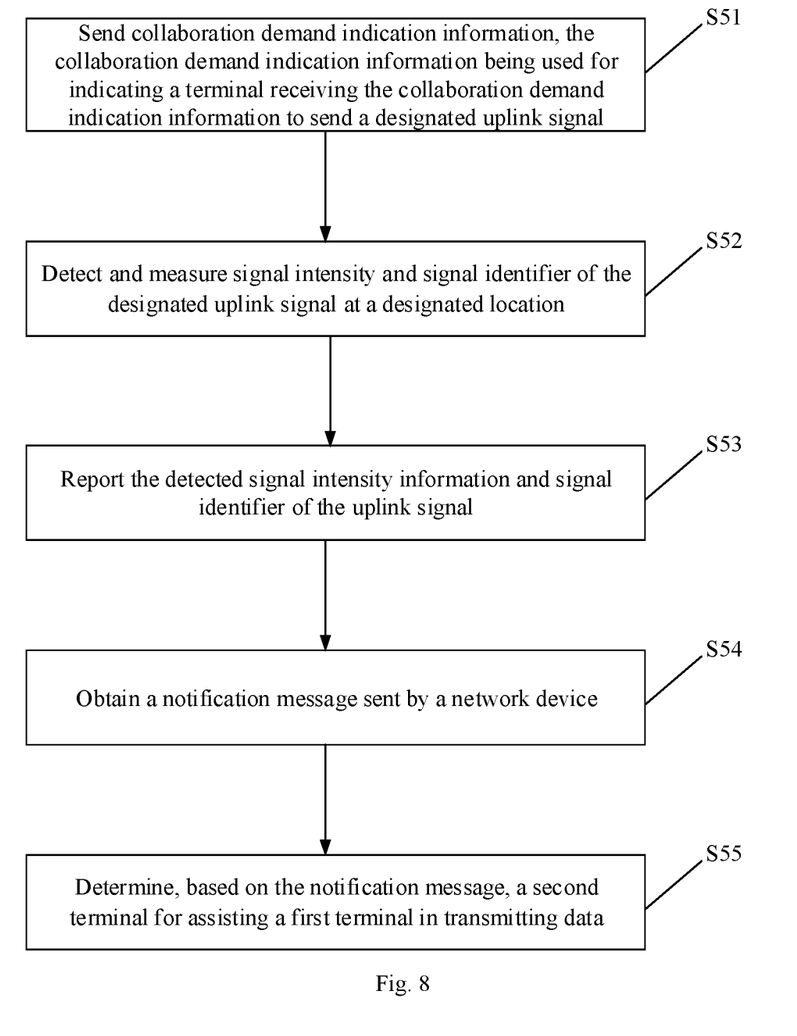
FIG. 8 is a flowchart of yet another method for communication according to an example.

FIG. 8 is a flowchart of a method for communication according to an example of the disclosure. Referring to FIG. 8, the method for communication is applied to a first terminal, and includes the following steps S51 to S55.

In step S51, collaboration demand indication information is sent. The collaboration demand indication information is used for indicating a terminal receiving the collaboration demand indication information to send a designated uplink signal.

In the example of the disclosure, the first terminal may send the collaboration demand indication information at a predefined location. After receiving the collaboration demand indication information, a peripheral terminal may send the designated uplink signal at a pre-defined or pre-configured time-frequency resource location. It can be understood that sequences of uplink signals sent by different terminals may be different.

In the example of the disclosure, second configuration information may be sent by a network device, and the second configuration information is used for indicating the terminal to send a designated uplink signal when receiving the collaboration demand indication information sent by the first terminal.

In step S52, signal intensity and signal identifier of the designated uplink signal are detected and measured at a designated location.

In the example of the disclosure, the first terminal needs to predetermine the uplink signal to be detected. For example, the first terminal may receive the configuration information of the network device in advance or obtain the uplink signals to be detected according to a predefined method.

In step S53, the detected signal intensity information and signal identifiers of the uplink signals are reported.

In one implementation of the example of the disclosure, the first terminal may report signal identifiers and corresponding signal intensity information of all measured uplink signals to the network device.

In another implementation of the example of the disclosure, the first terminal reports signal intensity information and signal identifiers of uplink signals with signal intensity being greater than a designated signal intensity threshold, or the first terminal reports signal intensity information and signal identifiers of predefined uplink signals.

The network device determines the collaborative terminal of the first terminal based on the detected signal intensity information and signal identifier of the uplink signal reported by the first terminal, and notifies the first terminal and a second terminal of a determination result of the collaborative terminal.

In step S54, a notification message sent by the network device is obtained.

In step S55, the second terminal for assisting the first terminal in transmitting data is determined based on the notification message.

Figure 9:
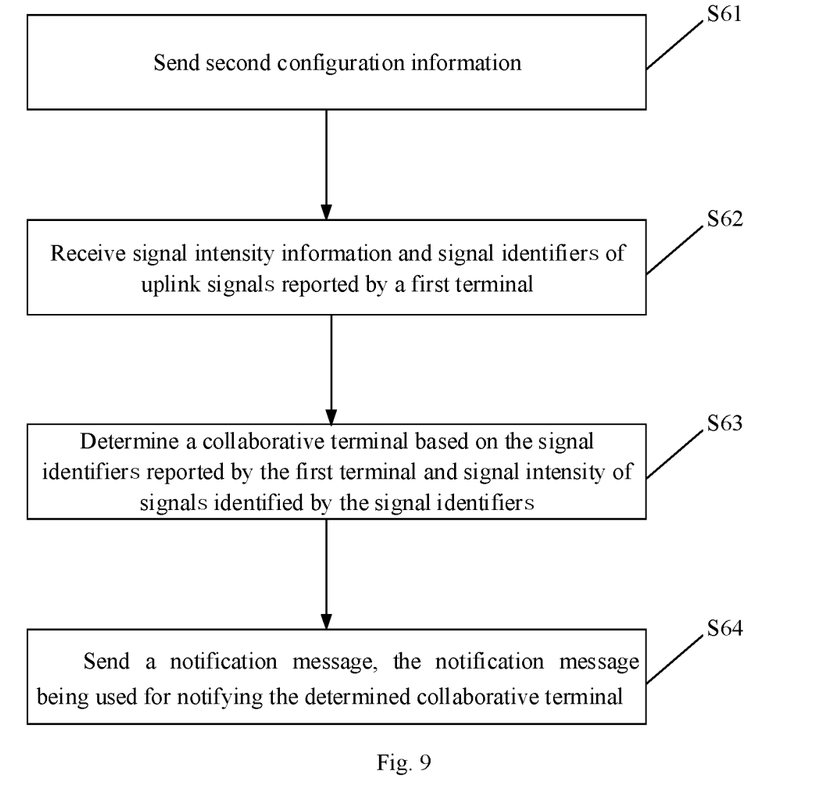
FIG. 9 is a flowchart of yet another method for communication according to an example.

FIG. 9 is a flowchart of a method for communication according to an example of the disclosure. Referring to FIG. 9, the method for communication is applied to a network device, and includes the following steps S61 to S64.

In step S61, second configuration information is sent.

The second configuration information is used for indicating a collaborative terminal to send an uplink signal when receiving collaboration demand indication information sent by a first terminal.

In step S62, signal intensity information and signal identifiers of uplink signals reported by the first terminal are received.

The signal intensity information and signal identifiers of the uplink signals reported by the first terminal include: signal intensity information and signal identifiers of uplink signals with signal intensity being greater than a designated signal intensity threshold.

In step S63, the collaborative terminal is determined based on the signal identifiers reported by the first terminal and signal intensity of signals identified by the signal identifiers.

In step S64, a notification message is sent. The notification message is used for notifying the first terminal and a second terminal of a determination result of the collaborative terminal.

After the first terminal and the second terminal receive the notification message sent by the network device, the collaborative terminal may be determined.

In the example of the disclosure, the first terminal reports the collaboration demand indication information and reports the detected signal intensity information and signal identifiers of the uplink signals. The network device determines the collaborative terminal of the first terminal based on the detected signal intensity information and signal identifiers of the uplink signals reported by the first terminal, and notifies the first terminal and the second terminal of the determination result of the collaborative terminal. The first terminal performs communication based on the collaborative terminal identified by the network device, so that the network coverage performance can be effectively improved.

It can be understood that the method for communication provided by the example of the disclosure may be applicable to the interaction process between the network device and the terminals. The execution process of operations of the terminals and the network device involved in the interaction process may refer to the relevant descriptions of the above examples, which will not be repeated here.

According to the method for communication provided by the example of the disclosure, the first terminal may identify the collaborative terminal, and then the collaborative terminal assists the first terminal in transmitting data, so that the network coverage performance can be effectively improved.

Based on the same concept, an example of the disclosure further provides an apparatus for communication.

It can be understood that in order to realize the above functions, the apparatus for communication provided by the example of the disclosure includes hardware structures and/or software modules for performing corresponding functions. In combination with units and algorithm steps of each instance disclosed in the example of the disclosure, the example of the disclosure can be implemented in the form of hardware or a combination of hardware and computer software. Whether a function is performed by hardware or computer software driven hardware depends on the specific application and design constraints of the technical solutions. Those skilled in the art can use different methods to implement the described functions for each specific application, but such implementation cannot be considered to be beyond the scope of the technical solutions of the example of the disclosure.

Figure 10:
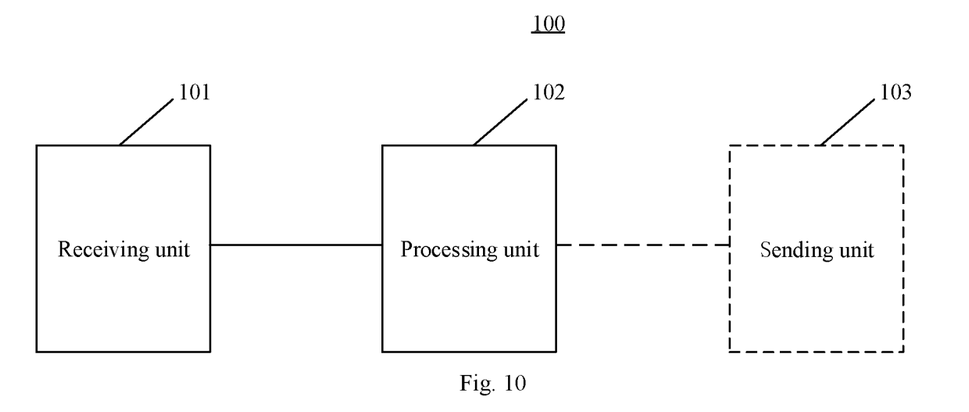
FIG. 10 is a block diagram of an apparatus for communication according to an example.

FIG. 10 is a block diagram of an apparatus for communication according to an example of the disclosure. Referring to FIG. 10, the apparatus 100 for communication is applied to a first terminal, and includes a receiving unit 101 and a processing unit 102.

The receiving unit 101 is configured to obtain a notification message sent by a network device. The notification message is used for notifying a determined collaborative terminal, and the collaborative terminal is a second terminal different from the first terminal. The processing unit 102 is configured to determine, based on the notification message, the second terminal for assisting the first terminal in transmitting data.

The collaborative terminal is determined by the network device based on geographic location information or signal intensity information measured by the first terminal.

In one implementation, the collaborative terminal is one or a combination of the following terminals:
a terminal geographically closest to the first terminal; a terminal with the highest signal intensity measured by first terminal; one or more terminals with a geographical distance from the first terminal being smaller than a designated distance threshold; and one or more terminals with signal intensity measured by the first terminal being greater than a designated signal intensity threshold.

In another implementation, the receiving unit 101 is further configured to obtain first configuration information sent by the network device. The first configuration information includes indication information used for indicating the first terminal to measure, at a designated location, signal intensity of target signals for target terminals and to listen at the designated location and report the signal intensity of the target signals of the target terminals. The collaborative terminal is determined among the target terminals by the network device based on the signal intensity of the target signals.

In one implementation, the collaborative terminal is determined by the network device based on a signal identifier reported by the first terminal and signal intensity of a signal identified by the signal identifier.

In one implementation, the apparatus 100 for communication further includes a sending unit 103. The sending unit 103 is configured to: send collaboration demand indication information. The collaboration demand indication information is used for indicating a terminal receiving the collaboration demand indication information to send a designated uplink signal, and report detected signal intensity information and signal identifier of the uplink signal. The receiving unit 101 is further configured to detect and measure signal intensity information and signal identifier of the designated uplink signal at the designated location.

The sending unit 103 reports signal intensity information and signal identifiers of uplink signals with signal intensity being greater than a designated signal intensity threshold.

Figure 11:
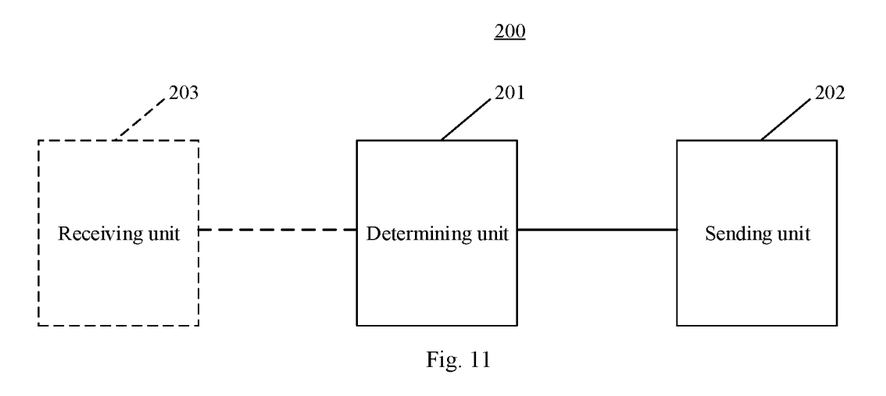
FIG. 11 is a block diagram of another apparatus for communication according to an example.

FIG. 11 is a block diagram of an apparatus for communication according to an example of the disclosure. Referring to FIG. 11, the apparatus 200 for communication is applied to a network device, and includes a determining unit 201 and a sending unit 202.

The determining unit 201 is configured to determine a collaborative terminal of a first terminal. The sending unit 202 is configured to send a notification message. The notification message is used for notifying the determined collaborative terminal, and the collaborative terminal is a second terminal different from first terminal.

In one implementation, the determining unit 201 is configured to determine the collaborative terminal of the first terminal based on geographic location information or signal intensity information measured by the first terminal.

In one implementation, the collaborative terminal is one or a combination of the following terminals:
a terminal geographically closest to the first terminal; a terminal with the highest signal intensity measured by first terminal; one or more terminals with a geographical distance from the first terminal being smaller than a designated distance threshold; and one or more terminals with signal intensity measured by the first terminal being greater than a designated signal intensity threshold.

In one implementation, the apparatus 200 for communication further includes a receiving unit 203, and the receiving unit 203 is configured to obtain geographic location information of the first terminal. The sending unit 202 is further configured to trigger at least one terminal other than the first terminal to report geographic location information.

In one implementation, the sending unit 202 is further configured to send first configuration information. The first configuration information includes indication information used for indicating the first terminal to measure, at a designated location, signal intensity of target signals for target terminals. The collaborative terminal is determined among the target terminals by the network device based on the signal intensity of the target signals.

The first configuration information further includes signal feature information of the target signals.

In one implementation, the apparatus 200 for communication further includes a receiving unit 203. The receiving unit 203 is configured to:
receive signal intensity information and signal identifiers of uplink signals reported by the first terminal.

The determining unit 201 determines the collaborative terminal based on the signal identifiers reported by the first terminal and signal intensity of the signals identified by the signal identifiers.

The signal intensity information and signal identifiers of the uplink signals reported by the first terminal include: signal intensity information and signal identifiers of uplink signals with signal intensity being greater than a designated signal intensity threshold.

In one implementation, the sending unit 202 is further configured to: send second configuration information. The second configuration information is used for indicating the collaborative terminal to send the uplink signals when receiving collaboration demand indication information sent by the first terminal.

As for the apparatus in the above example, the specific manner in which each module performs operations has been described in detail in the method example, and detailed description will not be given here.

Figure 12:
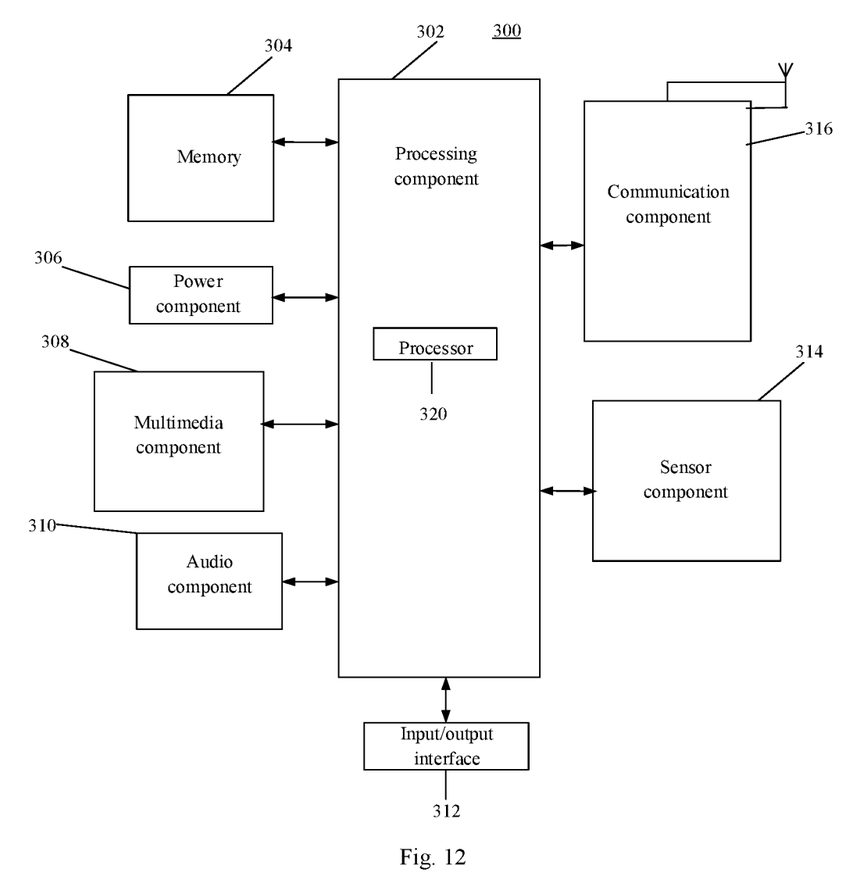
FIG. 12 is a schematic diagram of an apparatus configured to identify a collaborative terminal according to an example.

FIG. 12 is a block diagram of an apparatus 300 configured to identify a collaborative terminal according to an example. The apparatus 300 may be a terminal. For terminal may be a mobile phone, a computer, a digital broadcasting terminal, a messaging device, a game console, a tablet device, a medical device, a fitness device, a personal digital assistant, etc.

Referring to FIG. 12, the apparatus 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls the overall operation of the apparatus 300, such as operations associated with display, telephone call, data communication, camera operations, and recording operations. The processing component 302 may include one or more processors 320 to execute instructions to complete all or part of the steps of the above method. In addition, the processing component 302 may include one or more modules to facilitate interaction between the processing component 302 and other components. For example, the processing component 302 may include a multimedia module to facilitate interaction between the multimedia component 308 and the processing component 302.

The memory 304 is configured to store various types of data to support operations at the apparatus 300. Examples of these data include instructions for any application or method operating on the apparatus 300, contact data, phonebook data, messages, pictures, videos, etc. The memory 304 may be implemented by any type of volatile or nonvolatile storage device or their combination, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or a compact disk.

The power component 306 provides power for various components of the apparatus 300. The power component 306 may include a power management system, one or more power sources and other components associated with generating, managing and distributing power for the apparatus 300.

The multimedia component 308 includes a screen providing an output interface between the apparatus 300 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, sliding and gestures on the touch panel. The touch sensor not merely can sense the boundary of the touch or sliding operation, but also can detect the duration and pressure related to the touch or sliding operation. In some examples, the multimedia component 308 includes a front camera and/or a rear camera. When the apparatus 300 is in an operation mode, such as a shooting mode or a video mode, the front camera and/or the rear camera can receive external multimedia data. Each front camera and rear camera can be a fixed optical lens system or have a focal length and optical zoom capability.

The audio component 310 is configured to output and/or input audio signals. For example, the audio component 310 includes a microphone (MIC) configured to receive an external audio signal when the apparatus 300 is in the operation mode, such as a call mode, a recording mode, and a speech recognition mode. The received audio signal may be further stored in the memory 304 or transmitted via the communication component 316. In some examples, the audio component 310 further includes a speaker for outputting an audio signal.

The I/O interface 312 provides an interface between the processing component 302 and a peripheral interface module which can be a keyboard, a click wheel, a button, etc. These buttons may include but are not limited to: a home button, volume buttons, a start button and a lock button.

The sensor component 314 includes one or more sensors for providing state evaluation of various aspects of the apparatus 300. For example, the sensor component 314 can detect an on/off state of the apparatus 300 and the relative positioning of the components, for example, the component is a display and a keypad of the apparatus 300. The sensor component 314 can also detect the change of the position of the apparatus 300 or one component of the apparatus 300, the presence or absence of user contact with the apparatus 300, the azimuth or acceleration/deceleration of the apparatus 300, and temperature change of the apparatus 300. The sensor component 314 may include a proximity sensor configured to detect the presence of nearby objects without any physical contact. The sensor component 314 may further include an optical sensor, such as a CMOS or CCD image sensor, for use in imaging applications. In some examples, the sensor component 314 may further include an acceleration sensor, a gyroscope sensor, a magnetic sensor, a pressure sensor, or a temperature sensor.

The communication component 316 is configured to facilitate wired or wireless communication between the apparatus 300 and other devices. The apparatus 300 may access a wireless network based on a communication standard, such as WiFi, 2G or 3G, or their combination. In an example, the communication component 316 receives a broadcast signal or broadcast-related information from an external broadcast management system via a broadcast channel. In an example, the communication component 316 further includes a near field communication (NFC) module to facilitate short-range communication. For example, the NFC module may be implemented based on the radio frequency identification (RFID) technology, the infrared data association (IrDA) technology, the ultra wideband (UWB) technology, the Bluetooth (BT) technology and other technologies.

In an example, the apparatus 300 may be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for performing the above method.

In an example, a non-temporary computer-readable storage medium including instructions, such as the memory 304 including instructions is further provided. The instructions can be executed by the processor 320 of the apparatus 300 to complete the above method. For example, the non-temporary computer-readable storage medium may be a ROM, a random access memory (RAM), a CD-ROM, a magnetic tape, a floppy disk, an optical data storage device, etc.

Figure 13:
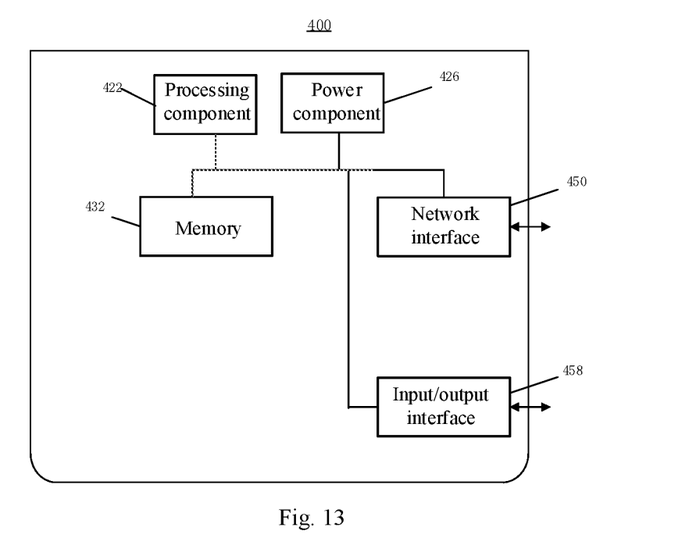
FIG. 13 is a schematic diagram of another apparatus configured to identify a collaborative terminal according to an example.

FIG. 13 is a block diagram of an apparatus 400 configured to identify a collaborative terminal according to an example. The apparatus 400 may be a network device. Referring to FIG. 13, the apparatus 400 includes a processing component 422 which further includes one or more processors, and a memory resource represented by a memory 432 for storing instructions executable by the processing component 422, such as an application. The application stored in the memory 432 may include one or more modules each corresponding to a set of instructions. The processing component 422 is further configured to execute instructions to perform the above method.

The apparatus 400 may further include a power supply component 426 configured to perform power management of the apparatus 400, a wired or wireless network interface 450 configured to connect the apparatus 400 to a network, and an input/output (I/O) interface 458. The apparatus 400 may operate an operating system stored in the memory 432, such as Windows Server™, Mac OS X™, Unix™, Linux™, FreeBSD™ or the like.

In an example, a non-temporary computer-readable storage medium including instructions, such as a memory 304 including instructions is further provided. The instructions can be executed by the processor 320 of the apparatus 300 to complete the above method. For example, the non-temporary computer-readable storage medium may be a ROM, a random access memory (RAM), a CD-ROM, a magnetic tape, a floppy disk, an optical data storage device, etc.

It can be understood that "a plurality of" in the disclosure refers to two or more, and other quantifiers are similar. "And/or" describes the association relationship of associated objects, which means that there can be three kinds of relationships, for example, A and/or B can mean that there are three kinds of cases: A alone, A and B at the same time, and B alone. The character "/" universally indicates that associated objects are in an "or" relationship. The singular forms "one", "said" and "the" are also intended to include the plural forms unless the context clearly indicates other meanings.

It can be further understood that the terms "first", "second" and the like are used to describe various information, but these information cannot be limited to these terms. These terms are merely used to distinguish the same type of information from each other, and do not indicate a specific order or importance. In fact, the expressions "first" and "second" can be used interchangeably. For example, without departing from the scope of the disclosure, a first information frame may also be referred to as a second information frame, and in the same manner, a second information frame may also be referred to as a first information frame.

It can be further understood that in the examples of the disclosure, although the operations are described in a specific order in the drawings, it cannot be understood as requiring these operations to be performed in the specific order or serial order shown, or requiring to achieve the desired results by performing all the operations shown. Multitasking and parallel processing may be advantageous in a particular environment.

Other implementations of the disclosure will be apparent to those skilled in the art from consideration of the specification and practice of the disclosure herein. The present application is intended to cover any variations, uses, or adaptations of the disclosure following the general principles of the disclosure and including such departures from the disclosure as come within known or customary practice in the art. It is intended that the specification and examples be considered as examples merely, with a true scope and spirit of the disclosure being indicated by the following claims.

It will be appreciated that the disclosure is not limited to the exact construction that has been described above and illustrated in the accompanying drawings, and that various modifications and changes may be made without departing from the scope of the disclosure. It is intended that the scope of the disclosure merely be limited by the appended claims.

The invention claimed is:

1. A method for communication, performed by a first terminal, the method comprising:
   obtaining a notification message sent by a network device, the notification message being used for notifying a determined collaborative terminal, and the determined collaborative terminal being a second terminal different from the first terminal; and
   determining, based on the notification message, the second terminal for assisting the first terminal in transmitting data;
   wherein the determined collaborative terminal comprises a collaborative terminal determined by the network device based on signal identifier reported by the first terminal and signal intensity of signal identified by the signal identifier;
   wherein the method further comprises:
      sending collaboration demand indication information, the collaboration demand indication information being used for indicating a terminal that receives the collaboration demand indication information to send a designated uplink signal;
      detecting and measuring signal intensity and signal identifier of the designated uplink signal at a designated location; and
      reporting the detected and measured signal intensity and signal identifier of the designated uplink signal, wherein the detected and measured signal intensity and signal identifier are used by the network device to determine the collaborative terminal.

2. The method for communication according to claim 1, wherein the determined collaborative terminal comprises a collaborative terminal determined by the network device based on geographic location information or the signal intensity measured by the first terminal.

3. The method for communication according to claim 2, wherein the determined collaborative terminal is one or a combination of the following terminals:
   a terminal geographically closest to the first terminal;
   a terminal with a highest signal intensity measured by the first terminal;
   one or more terminals with a geographical distance from the first terminal being smaller than a designated distance threshold; and
   one or more terminals with signal intensity measured by the first terminal being greater than a designated signal intensity threshold.

4. The method for communication according to claim 2, further comprising:
  obtaining first configuration information sent by the network device, the first configuration information comprising indication information used for indicating the first terminal to measure, at a designated location, signal intensity of target signals for target terminals; and
  listening at the designated location and reporting the signal intensity of the target signals of the target terminals, wherein
  the determined collaborative terminal is determined among the target terminals by the network device based on the signal intensity of the target signals.

5. The method for communication according to claim 1, wherein reporting the detected and measured signal intensity and signal identifier of the designated uplink signal comprises:
  reporting signal intensity and signal identifier of the designated uplink signal with signal intensity being greater than a designated signal intensity threshold.

6. A method for communication, performed by a network device, the method comprising:
  determining a collaborative terminal of a first terminal; and
  sending a notification message, the notification message being used for notifying the determined collaborative terminal, and the determined collaborative terminal being a second terminal different from the first terminal;
  wherein determining the collaborative terminal of the first terminal comprises:
    sending second configuration information, the second configuration information being used for indicating a terminal receiving collaboration demand indication information sent by the first terminal to send a designated uplink signal;
    receiving signal intensity and signal identifier of the designated uplink signal reported by the first terminal; and
    determining the collaborative terminal of the first terminal based on the signal identifier reported by the first terminal and signal intensity of signal identified by the signal identifier.

7. The method for communication according to claim 6, wherein determining the collaborative terminal of the first terminal further comprises:
  determining the collaborative terminal of the first terminal based on geographic location information or the signal intensity measured by the first terminal.

8. The method for communication according to claim 7, wherein the collaborative terminal is one or a combination of the following terminals:
  a terminal geographically closest to the first terminal;
  a terminal with a highest signal intensity measured by the first terminal;
  one or more terminals with a geographical distance from the first terminal being smaller than a designated distance threshold; and
  one or more terminals with signal intensity measured by the first terminal being greater than a designated signal intensity threshold.

9. The method for communication according to claim 7, further comprising:
  obtaining geographic location information of the first terminal, and triggering at least one terminal other than the first terminal to report geographic location information.

10. The method for communication according to claim 7, further comprising:
  sending first configuration information, the first configuration information comprising indication information used for indicating the first terminal to measure, at a designated location, signal intensity of target signals for target terminals, wherein
  the collaborative terminal is determined among the target terminals by the network device based on the signal intensity of the target signals.

11. The method for communication according to claim 10, wherein the first configuration information further comprises signal feature information of the target signals.

12. The method for communication according to claim 6, wherein the signal intensity and signal identifier of the designated uplink signal reported by the first terminal comprise:
  signal intensity information and signal identifier of the designated uplink signal with signal intensity being greater than a designated signal intensity threshold, and wherein
  the collaborative terminal is determined by the network device based on the signal identifier reported by the first terminal and signal intensity of signal identified by the signal identifier.

13. An apparatus for communication, comprising:
  one or more processors; and
  a memory configured to store processor-executable instructions, wherein
  the one or more processors are collectively configured to execute the processor-executable instructions to:
    obtain a notification message sent by a network device, the notification message being used for notifying a determined collaborative terminal, and the determined collaborative terminal being a second terminal different from the first terminal; and
    determine, based on the notification message, the second terminal for assisting the first terminal in transmitting data;
    wherein the determined collaborative terminal comprises a collaborative terminal determined by the network device based on signal identifier reported by the first terminal and signal intensity of signal identified by the signal identifier;
    wherein the one or more processors are further collectively configured to:
      send collaboration demand indication information, the collaboration demand indication information being used for indicating a terminal that receives the collaboration demand indication information to send a designated uplink signal;
      detect and measure signal intensity and signal identifier of the designated uplink signal at a designated location; and
      report the detected and measured signal intensity and signal identifier of the designated uplink signal, wherein the detected and measured signal intensity and signal identifier are used by the network device to determine the collaborative terminal.

14. An apparatus for communication, comprising:
  one or more processors; and
  a memory configured to store processor-executable instructions, wherein the one or more processors are collectively configured to execute the processor-executable instructions to execute the method for communication according to claim 6.

15. The method for communication according to claim 3, further comprising:
obtaining first configuration information sent by the network device, the first configuration information comprising indication information used for indicating the first terminal to measure, at a designated location, signal intensity of target signals for target terminals; and listening at the designated location and reporting the signal intensity of the target signals of the target terminals, wherein the determined collaborative terminal is determined among the target terminals by the network device based on the signal intensity of the target signals.

16. The method for communication according to claim 8, further comprising:
obtaining geographic location information of the first terminal, and triggering at least one terminal other than the first terminal to report geographic location information.

* * * * *